United States Patent
Efrati et al.

(10) Patent No.: US 6,923,059 B2
(45) Date of Patent: Aug. 2, 2005

(54) ANGULAR MOTION MEASUREMENT ARRANGEMENT

(75) Inventors: Tzvi Efrati, Haifa (IL); Miki Naroditsky, Carmiel (IL); Maxim Goldshtein, Haifa (IL)

(73) Assignee: Rafael-Armament Development Authority Ltd., Haifa (IL)

( * ) Notice: Subject to any disclaimer, the term of this patent is extended or adjusted under 35 U.S.C. 154(b) by 0 days.

(21) Appl. No.: 10/797,099

(22) Filed: Mar. 11, 2004

(65) Prior Publication Data

US 2004/0177688 A1 Sep. 16, 2004

(30) Foreign Application Priority Data

Mar. 11, 2003 (IL) .................................................. 154871

(51) Int. Cl.[7] .............................. G01P 3/04; G01P 1/00; G01C 21/00
(52) U.S. Cl. ........................... 73/510; 73/493; 701/214; 701/221
(58) Field of Search ........................ 73/504.12–504.16, 73/504.02, 504.03, 504.04, 493, 512; 701/213, 214, 220, 221; 33/318, 321–323, 333

(56) References Cited

U.S. PATENT DOCUMENTS 5,272,922 A  12/1993  Watson
6,269,306 B1  7/2001  Ibrahim et al.

FOREIGN PATENT DOCUMENTS

DE    19758223    12/1997

*Primary Examiner*—Helen Kwok
(74) *Attorney, Agent, or Firm*—Mark M. Friedman

(57) ABSTRACT

An angular motion measurement system disposed on a movable platform having a first and second section, the system comprising a first and second measurement arrangement and a processor arrangement. The first measurement arrangement provides a first output indicative of angular motion of the first section and has a bandwidth above 50 Hertz and at least one of, a bias above 5 degrees per second and a scale factor above 10%. The second measurement arrangement provides a second output indicative of angular motion of the second section and has a bandwidth below 50 Hertz, a bias below 5 degrees per second and a scale factor below 10%. The processor arrangement is responsive to a plurality of inputs, which include the first and second output, generating a corrected output having a bandwidth above 50 Hertz, a bias below 5 degrees per second and a scale factor below 10%.

14 Claims, 1 Drawing Sheet

ANGULAR MOTION MEASUREMENT ARRANGEMENT

FIELD AND BACKGROUND OF THE INVENTION

The present invention relates to an angular motion measurement arrangement and, in particular, it concerns an angular rate sensor arrangement for a seeker head, which is part of a guided missile.

A guided missile includes a seeker head, which includes a sensor that is configured to sense a target. The seeker head is typically gimbaled, whereby an actuator is configured to ensure that the sensor always points in the direction of the target. Measurements of the angular velocity of the seeker head together with the seeker's measurements are then used to guide the missile toward the target.

The guided missile generally includes an inertial measurement unit (IMU) which measures the motion of the missile with respect to an inertial reference frame. Measurements made by the IMU in conjunction with measurements of the relative angle between the seeker head and the missile body could be used to calculate the angular velocity of the seeker head. Even though the IMU can provide measurements which are accurate with low noise and long term stability, the IMU cannot measure the high frequency dynamics of the guided missile and the seeker head needed for the stabilization of the seeker head. Therefore, a separate angular velocity measurement device is needed to measure directly the angular velocity of the seeker head. The angular velocity measurement device is typically based on one or more gyroscopes. The measured angular velocity of the seeker head is then used to guide the missile toward the target.

As discussed above the gyroscope(s) used in the angular velocity measurement device need to have a high bandwidth. Additionally, they need to give accurate results with low noise. Inexpensive gyroscopes may have a high bandwidth, but they lack long term accuracy in two aspects. First, they have a high bias such that, even when the seeker head is not moving they measure a very high angular velocity that can reach 100 degrees per second or more. Second, they have a bad scale factor that can reach an error of more than 20%. Therefore, a gyroscope having a low bias, good scale factor, low noise and high frequency bandwidth is needed in order to measure the angular velocity of the seeker head. Such a gyroscope can be expensive, approximately, $3,000 to $5,000 each.

There is therefore a motivation to provide a system for measuring the angular motion of a seeker head which has a low bias, good scale factor, low noise and high frequency bandwidth at a low price.

SUMMARY OF THE INVENTION

The present invention is an angular motion measurement system and method of operation thereof.

According to the teachings of the present invention there is provided, an angular motion measurement system disposed on a movable platform having a first section and a second section, comprising: (a) a first measurement arrangement configured to provide a first output indicative of angular motion of the first section, the first measurement arrangement having a bandwidth above 50 Hertz and at least one of, a bias above 5 degrees per second and a scale factor above 10%; (b) a second measurement arrangement configured to provide a second output indicative of angular motion of the second section, the second measurement arrangement having a bandwidth below 50 Hertz, a bias below 5 degrees per second and a scale factor below 10%; and (c) a processor arrangement responsive to a plurality of inputs, which include the first output and the second output, generating a corrected output having a bandwidth above 50 Hertz, a bias below 5 degrees per second and a scale factor below 10%.

According to a further feature of the present invention, there is also provided a third measurement arrangement configured to provide a third output indicative of relative angular motion between the first section and the second section, wherein the inputs include the third output.

According to a further feature of the present invention, the third measurement arrangement includes at least one of a potentiometer, encoder and resolver.

According to a further feature of the present invention the first output is indicative of a measurement of the angular velocity of the first section with respect to an inertial frame of reference; and the second output is indicative of a measurement of the angular velocity of the second section with respect to an inertial frame of reference.

According to a further feature of the present invention, the first measurement arrangement includes a gyroscope.

According to a further feature of the present invention, the second measurement arrangement includes a gyroscope.

According to a further feature of the present invention, the second measurement arrangement includes an inertial motion unit.

A method to measure angular motion of a first section of a movable platform, comprising the steps of: (a) providing a first measurement arrangement disposed on the first section, the first measurement arrangement configured to provide a first output indicative of angular motion of the first section, the first measurement arrangement having a bandwidth above 50 Hertz and at least one of, a bias above 5 degrees per second and a scale factor above 10%; (b) providing a second measurement arrangement disposed on a second section of the movable platform, the second measurement arrangement configured to provide a second output indicative of angular motion of the second section, the second measurement arrangement having a bandwidth below 50 Hertz, a bias below 5 degrees per second and a scale factor below 10%; and (c) processing a plurality of inputs, which include the first output and the second output, to generate a corrected output having a bandwidth above 50 Hertz, a bias below 5 degrees per second and a scale factor below 10%.

According to a further feature of the present invention, there is also provided the step of providing a third measurement arrangement configured to provide a third output indicative of relative angular motion between the first section and the second section, wherein the inputs include the third output.

According to a further feature of the present invention, the third measurement arrangement includes at least one of a potentiometer, encoder and resolver.

According to a further feature of the present invention the first output is indicative of a measurement of the angular velocity of the first section with respect to an inertial frame of reference; and the second output is indicative of a measurement of the angular velocity of the second section with respect to an inertial frame of reference.

According to a further feature of the present invention, the first measurement arrangement includes a gyroscope.

According to a further feature of the present invention, the second measurement arrangement includes a gyroscope.

According to a further feature of the present invention, the second measurement arrangement includes an inertial motion unit.

BRIEF DESCRIPTION OF THE DRAWINGS

The invention is herein described, by way of example only, with reference to the accompanying drawing, wherein.

DESCRIPTION OF THE PREFERRED EMBODIMENTS

Figure 1:
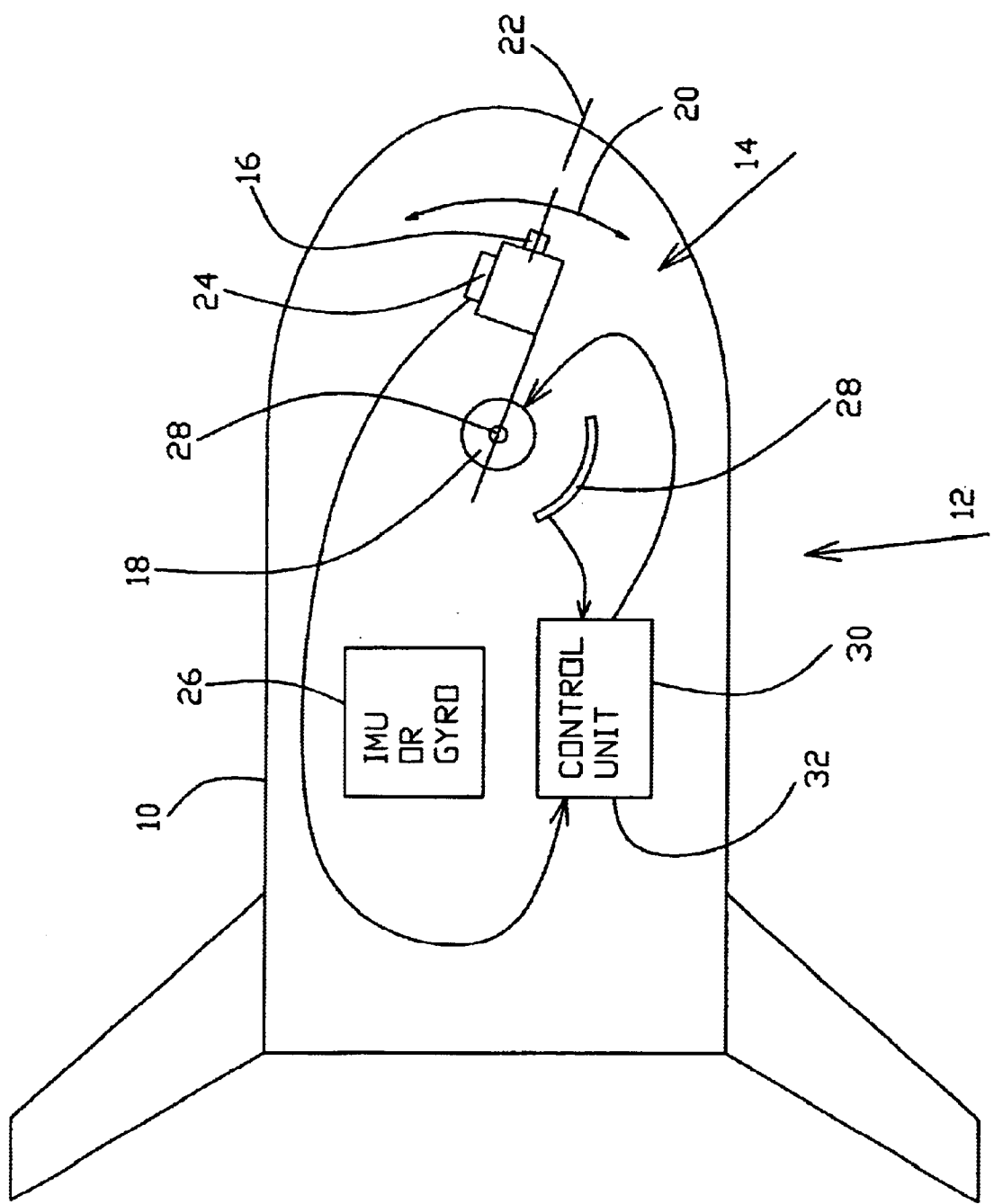
FIG. 1 is a cross-sectional schematic view of a guided missile having an angular motion measurement system that is constructed and operable in accordance with a preferred embodiment of the invention.

The present invention is an angular motion measurement system and method of operation thereof.

The principles and operation of an angular motion measurement system according to the present invention may be better understood with reference to the drawing and the accompanying description.

FIG. 1 is a cross-sectional schematic view of a guided missile 10 having an angular motion measurement system 12 that is constructed and operable in accordance with a preferred embodiment of the invention. Guided missile 10 has a seeker head 14 with a sensor 16. Seeker head 14 is gimbaled and includes an actuator 18, which points sensor 16 toward a target (not shown) during a flight of guided missile 10. A line of sight 22 defines the line between sensor 16 and the target. Actuator 18 is configured to move sensor 16 in the direction shown by arrows 20. Angular motion measurement system 12 is configured to measure the angular motion of seeker head 14 with respect to an inertial reference frame.

By way of introduction, angular motion measurement system 12 of the present invention provides a high bandwidth, low scale factor, low bias, low noise measurement system by using the output of an inexpensive measurement arrangement 24 such as a cheap gyroscope having a high bandwidth and low noise. The output of the inexpensive measurement arrangement suffers from long term stability. Therefore, a corrected output of the inexpensive measurement arrangement is generated using another measurement arrangement 26, which although does not have a sufficient bandwidth, has long term stability and low noise. This other measurement arrangement is typically the already existing IMU of guided missile 10 or another cheap gyroscope, which provides long-term stability but has a low bandwidth. In addition, another measurement arrangement 28 is needed to compensate for the angular degree of freedom which exists between measurement arrangement 24 and measurement arrangement 26, as will be explained below with reference to measurement arrangement 28.

In general terms, guided missile 10 can be described as a movable platform having a first section and a second section. The first section being seeker head 14 and the second section being the main body of guided missile 10.

Turning now to the details of angular motion measurement system 12 in more detail, measurement arrangement 24 is typically disposed on seeker head 14 adjacent to sensor 16. Measurement arrangement 24 is configured to provide an output indicative of the angular motion of seeker head 14 with respect to the inertial frame of reference. Angular motion is defined as angular displacement, angular velocity or angular acceleration. Since angular displacement, velocity and acceleration are related by integration and differentiation, the output of measurement arrangement 24 can be processed to provide the desired angular measurement whether it is displacement, velocity or acceleration. Typically, the output of measurement arrangement 24 is indicative of the angular velocity of seeker head 14 with respect to the inertial frame of reference. Measurement arrangement 24 has a bandwidth above 50 Hertz, a bias above 5 degrees per second and a scale factor above 10%. Measurement arrangement 24 typically includes at least one inexpensive gyroscope.

Measurement arrangement 26 is typically disposed in fixed orientation with the main body of guided missile 10. Measurement arrangement 26 is configured to provide an output indicative of the angular motion of guided missile 10 with respect to the inertial reference frame. The output of measurement arrangement 26 is typically indicative of a measurement of the angular velocity of guided missile 10 with respect to the inertial frame of reference. Measurement arrangement 26 has a bandwidth below 50 Hertz, a bias below 5 degrees per second and a scale factor below 10%. As described above measurement arrangement 26 is typically an IMU if there is one on guided missile 10, otherwise, measurement arrangement 26 is a cheap gyroscope.

As there is a degree of angular freedom between measurement arrangement 24 and measurement arrangement 26, it is necessary to have another measurement arrangement 28 which provides an output which is indicative of the relative angular motion between the measurement arrangement 24 and measurement arrangement 26. The output of measurement arrangement 28 is typically indicative of the angular displacement between seeker head 14 and the main body of guided missile 10. Measurement arrangement 28 generally includes a potentiometer, encoder or resolver.

Angular motion measurement system 12 also includes a processor 30, which is part of a control unit 32 of guided missile 10. Processor 30 is responsive to the outputs of measurement arrangement 24, measurement arrangement 26 and measurement arrangement 28, generating a corrected output having a bandwidth above 50 Hertz, a bias below 5 degrees per second and a scale factor below 10%. It should be noted that measurement arrangement 24 is not reset or calibrated by the combined outputs of measurement arrangement 26 and measurement arrangement 28. Instead, all the outputs of measurement arrangement 24, measurement arrangement 26 and measurement arrangement 28 are analyzed to produce a measurement of the angular motion of seeker head 14 with respect to the inertial reference frame with a high bandwidth, low noise and good long-term accuracy.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art which would occur to persons skilled in the art upon reading the foregoing description.

What is claimed is:

1. An angular motion measurement system disposed on a movable platform having a first section and a second section, comprising:

(a) a first measurement arrangement configured to provide a first output indicative of angular motion of the first section, said first measurement arrangement having a bandwidth above 50 Hertz and at least one of, a bias above 5 degrees per second and a scale factor above 10%;

(b) a second measurement arrangement configured to provide a second output indicative of angular motion of the second section, said second measurement arrangement having a bandwidth below 50 Hertz, a bias below 5 degrees per second and a scale factor below 10%; and (c) a processor arrangement responsive to a plurality of inputs, which include said first output and said second output, generating a corrected output having a bandwidth above 50 Hertz, a bias below 5 degrees per second and a scale factor below 10%.

2. The system of claim 1, further comprising a third measurement arrangement configured to provide a third output indicative of relative angular motion between the first section and the second section, wherein said inputs include said third output.

3. The system of claim 2, wherein said third measurement arrangement includes at least one of a potentiometer, encoder and resolver.

4. The system of claim 1, wherein:

(a) said first output is indicative of a measurement of the angular velocity of the first section with respect to an inertial frame of reference; and (b) said second output is indicative of a measurement of the angular velocity of the second section with respect to an inertial frame of reference.

5. The system of claim 1, wherein said first measurement arrangement includes a gyroscope.

6. The system of claim 1, wherein said second measurement arrangement includes a gyroscope.

7. The system of claim 1, wherein said second measurement arrangement includes an inertial motion unit.

8. A method to measure angular motion of a first section of a movable platform, comprising the steps of:

(a) providing a first measurement arrangement disposed on the first section, said first measurement arrangement configured to provide a first output indicative of angular motion of the first section, said first measurement arrangement having a bandwidth above 50 Hertz and at least one of, a bias above 5 degrees per second and a scale factor above 10%;

(b) providing a second measurement arrangement disposed on a second section of the movable platform, said second measurement arrangement configured to provide a second output indicative of angular motion of the second section, said second measurement arrangement having a bandwidth below 50 Hertz, a bias below 5 degrees per second and a scale factor below 10%; and (c) processing a plurality of inputs, which include said first output and said second output, to generate a corrected output having a bandwidth above 50 Hertz, a bias below 5 degrees per second and a scale factor below 10%.

9. The system of claim 8, further comprising the step of providing a third measurement arrangement configured to provide a third output indicative of relative angular motion between the first section and the second section, wherein said inputs include said third output.

10. The system of claim 9, wherein said third measurement arrangement includes at least one of a potentiometer, encoder and resolver.

11. The system of claim 8, wherein:

(a) said first output is indicative of a measurement of the angular velocity of the first section with respect to an inertial frame of reference; and (b) said second output is indicative of a measurement of the angular velocity of the second section with respect to an inertial frame of reference.

12. The system of claim 8, wherein said first measurement arrangement includes a gyroscope.

13. The system of claim 8, wherein said second measurement arrangement includes a gyroscope.

14. The system of claim 8, wherein said second measurement arrangement includes an inertial motion unit.

* * * * *